(12) United States Patent
Im et al.

(10) Patent No.: US 10,920,464 B2
(45) Date of Patent: Feb. 16, 2021

(54) TAILGATE OPENING AND CLOSING DEVICE FOR VEHICLE

(71) Applicants: Hyundai Motor Company, Seoul (KR); Kia Motors Corporation, Seoul (KR); PYEONG HWA AUTOMOTIVE CO., LTD., Daegu (KR)

(72) Inventors: Yong Hyuck Im, Seoul (KR); Ki Ryun Ahn, Daegu (KR)

(73) Assignees: Hyundai Motor Company, Seoul (KR); Kia Motors Corporation, Seoul (KR); PYEONG HWA AUTOMOTIVE CO., LTD., Daegu (KR)

( * ) Notice: Subject to any disclaimer, the term of this patent is extended or adjusted under 35 U.S.C. 154(b) by 550 days.

(21) Appl. No.: 15/787,000

(22) Filed: Oct. 18, 2017

(65) Prior Publication Data

US 2018/0171677 A1 Jun. 21, 2018

(30) Foreign Application Priority Data

Dec. 19, 2016 (KR) .......................... 10-2016-0173260

(51) Int. Cl.
*E05B 81/06* (2014.01)
*E05B 81/14* (2014.01)
*E05B 83/18* (2014.01)
*E05B 81/20* (2014.01)
*E05B 83/16* (2014.01)
(Continued)

(52) U.S. Cl.
CPC .............. *E05B 81/06* (2013.01); *E05B 81/14* (2013.01); *E05B 81/20* (2013.01); *E05B 83/16* (2013.01); *E05B 83/18* (2013.01); *B60J 5/101* (2013.01); *B62D 33/037* (2013.01); *E05B 81/34* (2013.01)

(58) Field of Classification Search
CPC .......... E05B 81/20; E05B 81/06; E05B 81/16; E05B 81/30; E05B 81/66; E05B 81/68; E05B 81/90; E05B 81/04; E05B 81/42; E05B 81/44; E05B 83/18; E05B 81/14; E05B 81/34; E05B 83/16; Y10T 292/1082; Y10T 292/1047; Y10S 292/29;
(Continued)

(56) References Cited

U.S. PATENT DOCUMENTS 4,892,339 A * 1/1990 Kleefeldt ................ E05B 81/20
292/201
5,765,884 A * 6/1998 Armbruster ............. E05B 81/20
292/1
(Continued)

FOREIGN PATENT DOCUMENTS

DE 102011012656 A1 * 8/2012 ............. E05B 81/20
DE 102012102724 A1 * 10/2013 ............. E05B 81/68
(Continued)

*Primary Examiner* — Alyson M Merlino
(74) *Attorney, Agent, or Firm* — Morgan, Lewis & Bockius LLP

(57) ABSTRACT

A tailgate opening and closing device for a vehicle may include a main gear disposed at a base, to be driven by a drive motor, and a lever assembly having an error lever, a pawl lever, a release lever, and a cinching lever. The lever assembly pivots in accordance with a rotation of the main gear the main gear, achieving locking or unlocking of a striker by a claw.

16 Claims, 15 Drawing Sheets

(51) Int. Cl.
*B62D 33/037* (2006.01)
*B60J 5/10* (2006.01)
*E05B 81/34* (2014.01)

(58) Field of Classification Search
CPC .... Y10S 292/42; Y10S 292/23; Y10S 292/65; Y10S 292/43; B62D 33/037
See application file for complete search history.

(56) References Cited

U.S. PATENT DOCUMENTS

| | | | | |
|---|---|---|---|---|
| 6,048,002 | A * | 4/2000 | Ohta | E05B 81/20 292/201 |
| 6,422,615 | B1 * | 7/2002 | Roos | E05B 81/20 292/201 |
| 2006/0284425 | A1 * | 12/2006 | Torka | E05B 81/20 292/201 |
| 2012/0091740 | A1 * | 4/2012 | Chevalier | E05B 81/20 292/226 |
| 2014/0252783 | A1 * | 9/2014 | Yokota | E05B 81/20 292/196 |
| 2017/0130492 | A1 * | 5/2017 | Machida | E05B 81/20 |

FOREIGN PATENT DOCUMENTS

| | | |
|---|---|---|
| JP | 2008-13932 A | 1/2008 |
| KR | 10-2008-0061625 A | 7/2008 |
| KR | 10-2014-0010123 A | 1/2014 |
| WO | WO 2012/119581 A2 | 9/2012 |
| WO | WO-2018030556 A2 * | 2/2018 ............. E05B 81/06 |

* cited by examiner

TAILGATE OPENING AND CLOSING DEVICE FOR VEHICLE

CROSS-REFERENCE(S) TO RELATED APPLICATIONS

The present application claims priority to Korean Patent Application No. 10-2016-0173260, filed on Dec. 19, 2016, the entire contents of which is incorporated herein for all purposes by this reference.

BACKGROUND OF THE INVENTION

Field of the Invention

The present invention relates to a tailgate opening and closing device, and more particularly, a tailgate opening and closing device for a vehicle configured for controlling locked and unlocked states of a trunk using a single drive motor.

Description of Related Art

Generally, a vehicle has a tailgate configured to open or close a rear compartment of the vehicle for loading or unloading of goods into or from the vehicle, doors configured to open or close a passenger compartment of the vehicle for passengers to enter or exit the vehicle, and a hood configured to open or close an engine compartment of the vehicle. A door latch, which is engaged with or disengaged from a striker, is disposed at each of the tailgate, the doors and the hood.

In the case of the door latch disposed to allow or prevent opening of the tailgate, namely a tailgate latch, engagement thereof with the striker associated therewith is secured only when the user applies sufficient force to the tailgate upon closing the tailgate. When the user applies insufficient force to the tailgate upon closing the tailgate, the tailgate latch may be incompletely engaged with the striker and, as such, the tailgate may be incompletely closed, and the user may overlook incomplete closure of the tailgate. In the present case, the user may recognize incomplete closure of the tailgate through a signal displayed on a dashboard after sitting on a driver seat. In the present regard, there may be an inconvenience in that the user should check closure of the tailgate after moving to the tailgate. To solve such a problem, a power tailgate latch has been proposed. The power tailgate latch may achieve complete closing of the tailgate using a drive motor.

In conventional cases, however, two drive motors are disposed to transmit power in separate directions for closing and opening of the tailgate. For the present reason, an excessive increase in volume occurs and, as such, there may be a difficulty in disposing the drive motors in the internal of a vehicle body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a tailgate opening and closing device for a vehicle, which is configured for not only achieving both functions of engagement and disengagement of a trunk latch, but also achieving emergency opening of a tailgate, using a single drive motor.

In accordance with an aspect of the present invention, the above and other objects can be accomplished by the provision of a tailgate opening and closing device for a vehicle including a base formed, at a first side thereof, with a first insertion hole into or from which a striker can be inserted or withdrawn, a main gear disposed at a second side of the base while being rotatable about a first rotation shaft by a drive motor, a claw rotatably disposed at a side of the first insertion hole of the base while being formed with a second insertion hole configured for receiving the striker, to lock the striker when the striker is inserted into the first insertion hole and the second insertion hole, and a lever assembly including an error lever disposed adjacent to the main gear and the claw while extending across between the main gear and the claw, a pawl lever for locking or unlocking the claw, a release lever connected to the error lever and the pawl lever while being pivotable about a second rotation shaft, and a cinching member connected, at a first side thereof, to the release lever while being connected, at a second side thereof, to the error lever wherein the cinching member is pivotable, causing the claw to lock or unlock the striker.

The drive motor may be mounted to the second side of the base at a position adjacent to the main gear. A worm gear may be provided at the drive motor to rotate the main gear while driving of the drive motor.

The lever assembly may further include a first link mounted to a rotation shaft, to which the main gear is mounted, wherein the first link rotates during rotation of the main gear, and a second link pivotably coupled, at a first end portion thereof, to the release lever while being pivotably coupled, at a second end portion thereof to the first link, forming a first coupler and a second coupler to pivot the second link during rotation of the first link.

The release lever may be pivotably coupled, at a first end portion thereof, to the second link while being pivotably coupled, at a second end portion thereof, to the base by the second rotation shaft, and the release lever may be bent at a center portion thereof to have a stepped structure wherein the second end portion of the release lever is closer to the base than the first end portion of the release lever.

The error lever may be disposed between the base and the release lever while being pivotably coupled, at a first end portion thereof, to the second rotation shaft. The error lever may extend upwards from the first end portion thereof to a second end portion thereof along a vertical length of the base. The error lever may be formed, at a center portion thereof, with an extension. The extension may be formed with a guide slit at an inside thereof, and is disposed between the main gear and the claw.

The guide slit of the extension may have a shape extending across the base wherein the guide slit extends across the base by a predetermined length, then extends across the base by a predetermined length while tapering downwards by a predetermined angle, and finally extends across the base by a predetermined length to achieve locking of the striker in a stepwise manner.

The cinching member may be disposed at a first side of the release lever between the release lever and the error lever wherein a first end portion of the cinching member is pivotably coupled to the release lever, forming a third coupler, and a guide protrusion protrudes from a second end portion of the cinching member wherein the guide protrusion protrudes into the guide slit, to be slidable along the guide slit during operation of the lever assembly for locking or unlocking of the claw.

The guide protrusion may further extend beyond the guide slit wherein the second link is engagable with the guide protrusion during an interrupt operation.

A first elastic member may be disposed at the third coupler where the release lever and the cinching member are coupled, to constantly urge the release lever toward the claw.

The pawl lever may be pivotably coupled to the base by the second rotation shaft, together with the release lever and the error lever. The pawl lever may be formed, at a first side thereof, with an engagement protrusion extending toward the claw configured to prevent or allow rotation of the claw. The pawl lever may be formed, at a second side thereof, with a first stopper configured to limit a pivotal angle of the release lever.

The claw may have a first engagement step and a second engagement step, which are formed along an external peripheral surface of the claw, wherein the pawl lever is engaged with the engagement steps in a stepwise manner, achieving locking or unlocking of the striker.

A second stopper may be formed at the claw to limit a sliding distance of the cinching member during sliding of the cinching member.

A second elastic member may be disposed at a third rotation shaft of the claw to constantly urge the claw toward the first insertion hole.

The tailgate opening and closing device may further include a first detector disposed adjacent to the release lever, a second detector disposed adjacent to the main gear, a third detector disposed adjacent to the claw, and a controller configured for receiving positional signals from the first to third detectors, and controlling the drive motor based on the received positional signals, the controller driving the drive motor upon determining the insertion of the striker into the first and second insertion holes, locking the striker inserted into the first and second holes.

The controller may be configured to operate the drive motor to perform a cinching operation, upon receiving signals from the first and second detectors, and may perform a control operation to complete the cinching operation upon subsequently receiving a signal from the first detector.

Upon receiving a signal from the third detector when separation of the striker from the claw has been completed, the controller may perform a control operation to return a predetermined position of the main gear to an original position thereof through the rotation of the drive motor.

Upon receiving a tailgate opening signal, the controller may operate the drive motor to pivot the release lever, rotating the claw for unlocking of the striker.

The tailgate opening and closing device having the above-described configuration has a cinching-integrated power latch structure, in detail, a cinching-integrated structure using a drive motor, a main gear, and a link assembly, and, as such, it may be possible to achieve a reduction in the number of constituent elements, a reduction in cost, and a reduction in weight through structural simplification. In addition, by the cinching-integrated structure, loss of operating power is reduced. Since the main gear is rotatable in the clockwise direction (CW) or in the counterclockwise direction (CCW), bidirectional release may be achieved. As a result, an enhancement in product quality may be achieved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
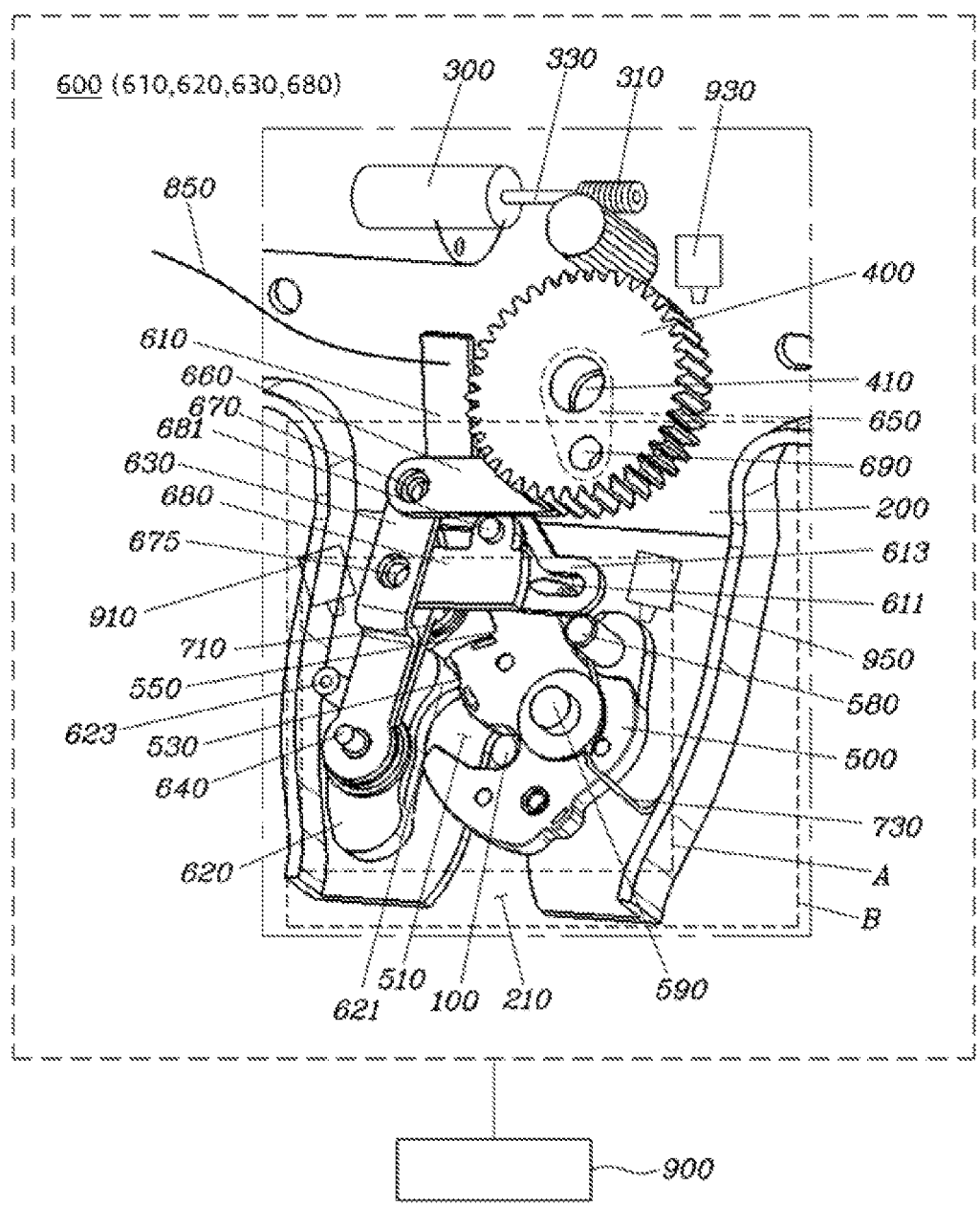
FIG. 1 is a view illustrating a tailgate opening and closing device for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
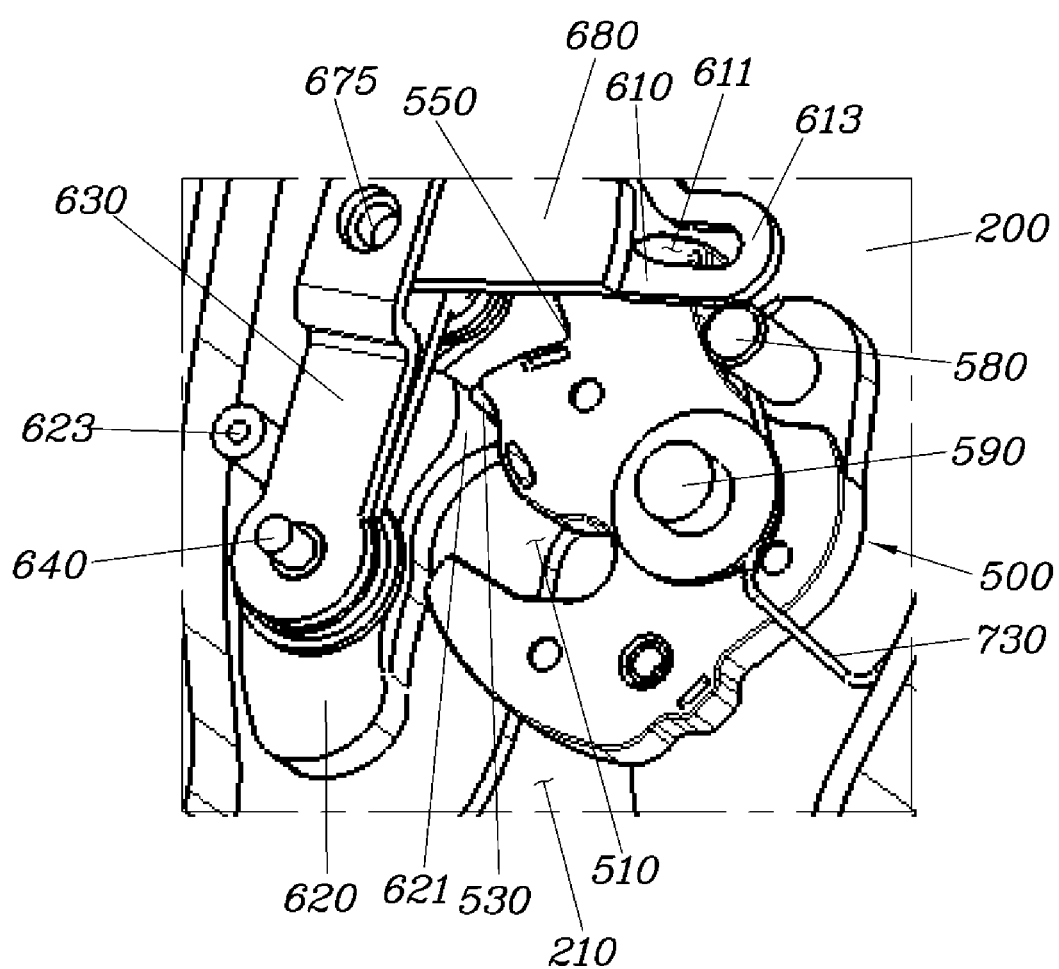
FIG. 2 is a view concretely illustrating a region A of FIG. 1.
Figure 3:
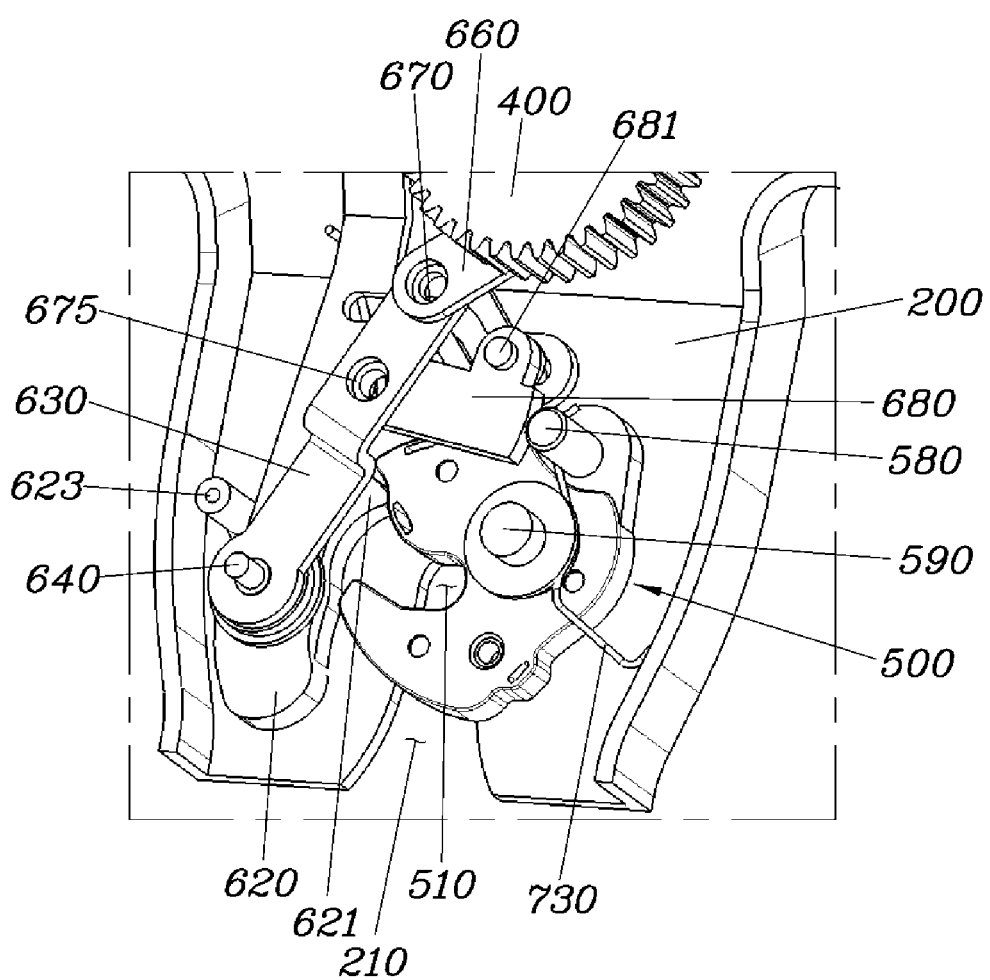
FIG. 3 is a view concretely illustrating a region B of FIG. 1.

FIG. 1 is a view illustrating a tailgate opening and closing device for a vehicle according to an exemplary embodiment of the present invention. FIG. 2 is a view concretely illustrating a region A of FIG. 1. FIG. 3 is a view concretely illustrating a region B of FIG. 1.

As illustrated in FIG. 1, the tailgate opening and closing device according to the exemplary embodiment of the present invention includes a base 200 formed, at a first side thereof, with a first insertion hole 210 into or from which a striker 100 can be inserted or withdrawn, a main gear 400 disposed at the second side of the base 200 while being rotatable about a first rotation shaft 410 by a drive motor 300, and a claw 500 rotatably disposed at the side of the first insertion hole 210 of the base 200 while being formed with a second insertion hole 510 for receiving the striker 100, to lock the striker 100 when the striker 100 is inserted into the first insertion hole 210 and the second insertion hole 510. The tailgate opening and closing device also includes a lever assembly 600 including an error lever 610 disposed adjacent to the main gear 400 and the claw 500 while extending across between the main gear 400 and the claw 500, a pawl lever 620 for locking or unlocking the claw 500, a release lever 630 connected to the error lever 610 and the pawl lever 620 while being pivotable about a second rotation shaft 640, and a cinching member 680 connected, at a first side thereof, to the release lever 630 while being connected, at a second side thereof, to the error lever 610 wherein the cinching member 680 is pivotable, causing the claw 500 to lock or unlock the striker 100.

The base 200 has a plate shape and is bent at edge portions thereof wherein various elements may be seated inside the base 200. As described above, the first insertion hole 210, into or from which a striker 100 can be inserted or withdrawn, is formed at a first side of the base 200. The first insertion hole 210 is formed to be recessed downwards when viewed in the drawings.

At the second side of the base 200, the main gear 400 is disposed to be rotatable in accordance with operation of the drive motor 300. The drive motor 300 includes a motor shaft 330, and a worm gear 310 formed at the motor shaft 330. While driving of the motor 300, accordingly, the motor shaft 330 rotates and, as such, the worm gear 310 rotates in accordance with rotation of the motor shaft 330. In accordance with the rotation of the worm gear 310, the main gear 400 rotates.

In addition, first and second links 650 and 660, which are also included in the lever assembly 600, are connected to the main gear 400 while being pivotably connected to each other. The first link 650 is fixedly mounted to the first rotation shaft 410, to which the main gear 400 is also fixedly mounted. Accordingly, the first link 650 rotates during rotation of the main gear 400. The first link 650 extends in a longitudinal direction corresponding to a radial direction of the first rotation shaft 410. Since the first link 650 is fixed to the main gear 400, the first link 650 constantly has the same behavior as the main gear 400.

The second link 660 is pivotably coupled, at a first end portion thereof, to the release lever 630 while being pivotably coupled, at a second end portion thereof, to the first link 650 and, as such, a first coupler 690 and a second coupler 670 are formed. During rotation of the first link 650, the second link 660 pivots about the first coupler 690. In accordance with pivoting of the second link 660, the release lever 630 pivots about the second coupler 670. Accordingly, during operation of the drive motor 300, the main gear 400 rotates and, as such, the first link 650 fixed to the main gear 400 rotates. In accordance with the rotation of the first link 650, the second link 660 pivots about the first coupler 690 and, as such, the release lever 630 pivots about the second coupler 670.

As described above, the lever assembly 600 includes the error lever 610, the pawl lever 620, the release lever 630, and the cinching member 680. The release lever 630 extends in a longitudinal direction corresponding to a vertical direction of the base 200 at a first side of the main gear 400 and claw 500 while being disposed to be pivotable about the second rotation shaft 640. The release lever 630 is pivotably coupled, at a first end portion thereof, to the second link 660 while being pivotably coupled, at a second end portion thereof, to the base 200 by the second rotation shaft 640. The release lever 630 is bent at a center portion thereof to have a stepped structure wherein the second end portion of the release lever 630 is closer to the base 200 than the first end portion of the release lever 630. Accordingly, the second end portion of the release lever 630 is lower than the first end portion of the release lever 630 with respect to the base 200 and, as such, a certain region is formed between the base 200 and the release lever 630. As a result, the adjacent levers and links of the lever assembly 600 may precisely operate during operation of the lever assembly 600 conducted in accordance with operation of the drive motor 300 without interfering with one another. The present operation will be described later with reference to the drawings.

The error lever 610 is disposed adjacent to the main gear 400 and the claw 500, between the base 200 and the release lever 630. The error lever 610 is pivotably coupled, at a first end portion thereof, to the second rotation shaft 640. The error lever 610 extends upwards from the first end portion thereof to a second end portion thereof along the vertical length of the base 200. The error lever 610 is formed, at a center portion thereof, with an extension 613. The extension 613 has a guide slit 611 at an inside thereof. The extension 613 is disposed between the main gear 400 and the claw 500.

The guide slit 611 of the extension 613 has a shape conforming to the shape of the extension 613 while extending across the base 200. The guide slit 611 extends across the base 200 by a predetermined length, then extends across the base 200 by a predetermined length while tapering downwards through a predetermined angle, and finally extends across the base 200 by a predetermined length. Accordingly, locking of the striker 100 by the claw 500 may be achieved in a stepwise manner.

The cinching member 680 is disposed at the first side of the release lever 630. The cinching member 680 is disposed between the release lever 630 and the error lever 610 wherein the first end portion of the cinching member 680 is pivotably coupled to the release lever 630. A guide protrusion 681 protrudes from a second end portion of the cinching member 680. The guide protrusion 681 protrudes into the guide slit 611, to be slidable along the guide slit 611. In addition, the guide protrusion 681 further extends beyond the guide slit 611 wherein the second link is engagable with the guide protrusion 681 during an interrupt operation. A first elastic member 710 is disposed at a third coupler 675 where the release lever 630 and the cinching member 680 are coupled. The first elastic member 710 is configured to constantly urge the release lever 630 towards the claw 500. (Emphasis added)

The pawl lever 620 is pivotably coupled to the base 200 by the second rotation shaft 640, together with the release lever 630 and the error lever 610. The pawl lever 620 is formed, at a first side thereof, with an engagement protrusion 621 extending toward the claw 500 to prevent or allow the rotation of the claw 500. The pawl lever 620 is formed, at the second side thereof, with a first stopper 623 configured to limit the pivotal angle of the release lever 630. In accordance with pivoting of the pawl lever 620, the claw 500 is locked or unlocked.

The claw 500 has a first engagement step 530, a second engagement step 550 and a third engagement step 570, which are formed along an external peripheral surface of the claw 500. As the pawl lever 620 is engaged with the engagement steps 530, 550, and 570 in a stepwise manner, primary locking, secondary locking, or unlocking of the striker 100 is achieved. A second stopper 580 is also formed at the claw 500 to limit the sliding distance of the cinching member 680 during sliding of the cinching member 680. In addition, a second elastic member 730 is disposed at a third rotation shaft 590 of the claw 500 to constantly urge the claw 500 toward the first insertion hole 210. Accordingly, the claw 500 is constantly urged toward the first insertion hole 210. A first end portion of the second elastic member 730 is supported by the second stopper 580, and a second end portion of the second elastic member 730 is supported by the base 200, and, as such, the second elastic member 730 constantly urges the claw 500 toward the first insertion hole 210. Since the first elastic member 710 disposed at the lever assembly 600 urges the release lever 630 and the pawl lever 620 toward the first insertion hole 210, and the second elastic member 730 disposed at the third rotation shaft 590 of the claw 500 urges the claw 500 toward the first insertion hole 210, as described above, the pawl lever 620 and the claw 500 maintain the striker 100 in a locked state.

In addition, an emergency handle is rotatably disposed at the base 200 above the release lever 630. When the user opens the tailgate using a vehicle key or when the tailgate is open in accordance with operation of the emergency handle, the emergency handle is rotated and, as such, an end portion of the emergency handle presses the release lever 630, pivoting the release lever 630. As a result, the pawl lever 620 is separated from the claw 500, unlocking the striker 100.

A first detector 910 is disposed adjacent to the release lever 630. A second detector 930 is disposed adjacent to the main gear 400. A third detector 950 is disposed adjacent to the claw 500. The tailgate opening and closing device according to the exemplary embodiment of the present invention also includes a controller 900 configured for receiving positional signals from the first to third detectors 910, 930, and 950, and controlling the drive motor 300 based on the received positional signals. Upon determining insertion of the striker 100 into the first and second insertion holes 210 and 510, the controller 900 operates the drive motor 300, locking the striker 100 inserted into the first and second holes 210 and 510.

Upon receiving a signal from the third detector 950, the controller 900 operates the drive motor 300 to perform a cinching operation. Upon subsequently receiving a signal from the first detector 910, the controller 900 performs a control operation to complete the cinching operation. Upon receiving a signal from the third detector 950 under the condition that separation of the striker 100 from the claw 500 has been completed, the controller 900 performs a control operation to return the set position of the main gear 400 to an original position thereof through rotation of the drive motor 300. That is, upon receiving a tailgate opening signal, the controller 900 operates the drive motor 300 to pivot the release lever 630 and, as such, the claw 500 rotates to unlock the striker 100.

Hereinafter, the tailgate opening and closing device according to the exemplary embodiment of the present invention will be described in more detail with reference to the accompanying drawings.

Figure 4:
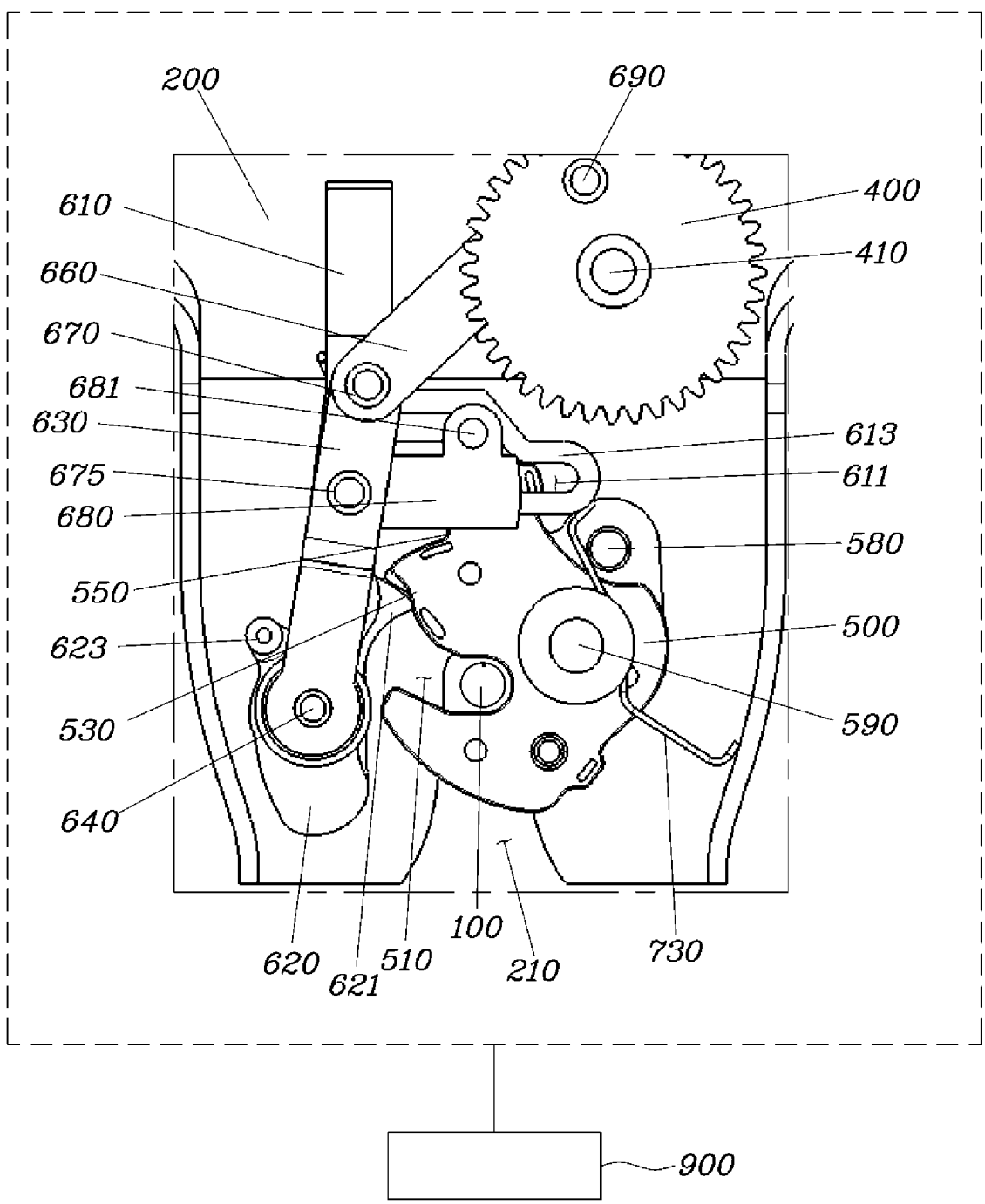
FIG. 4, FIG. 5, and FIG. 6 are views illustrating a release operation conducted through rotation in one direction in a stepwise manner.
Figure 5:
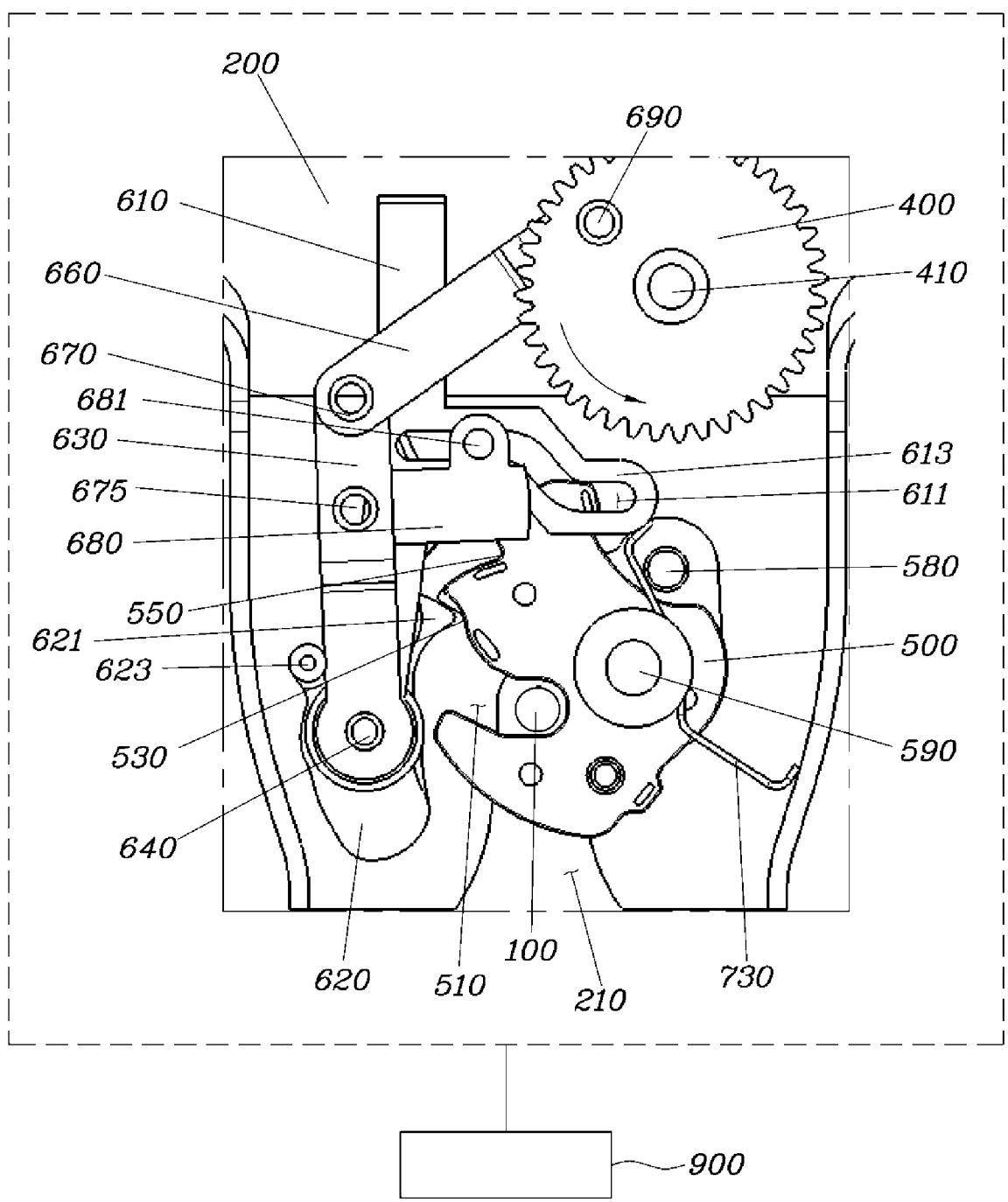
Figure 6:
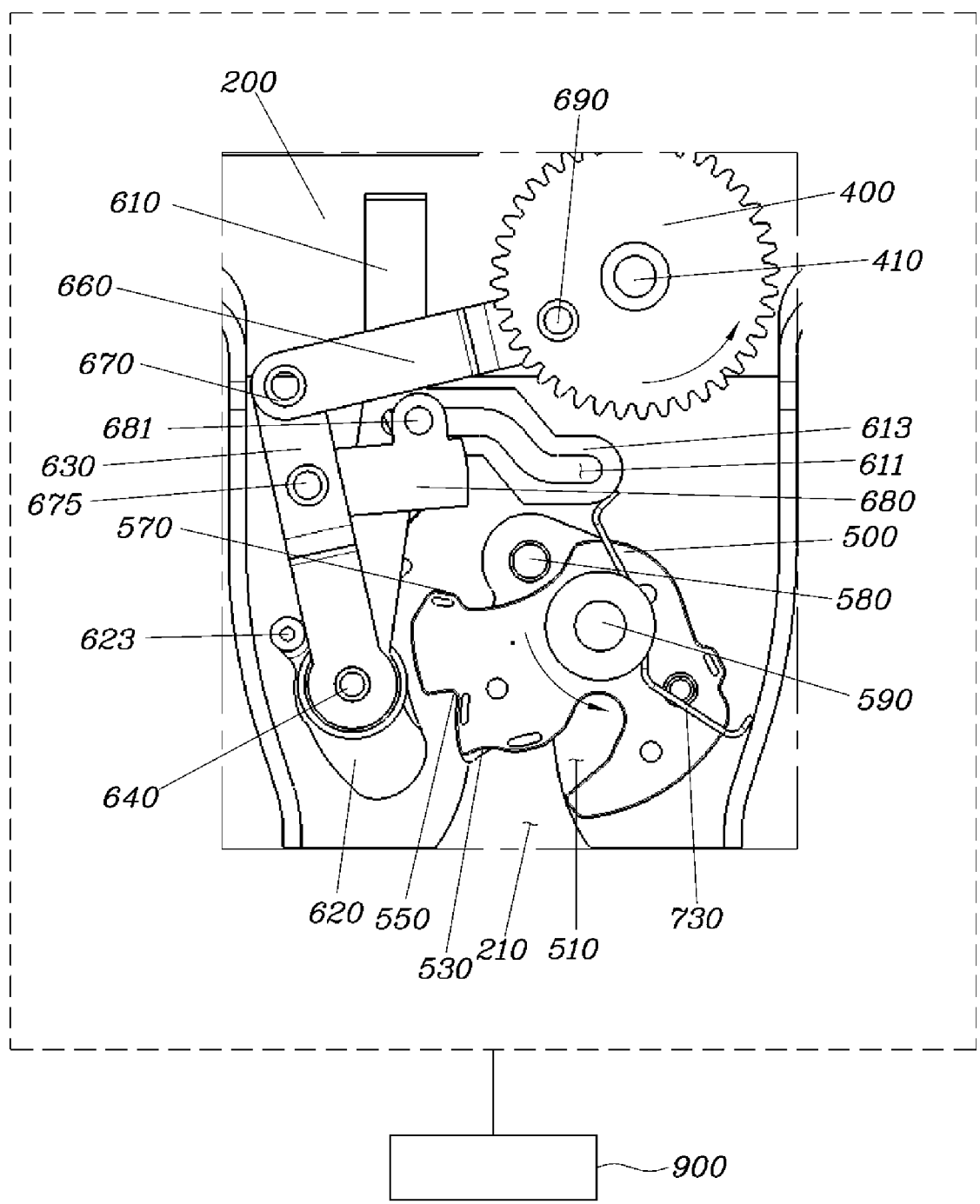

FIG. 4, FIG. 5, and FIG. 6 are views illustrating a release operation conducted through rotation in one direction in a stepwise manner. FIG. 4 is a view illustrating a closed state of the tailgate. In the present state, the first link 650, which rotates together with the main gear 400, is positioned at the 12 o'clock (approximately 90°) direction thereof. In accordance with the position of the first link 650, the second link 660 and the release lever 630 are appropriately positioned, as illustrated in FIG. 4. In the present state, the guide protrusion 681 of the cinching member 680 is positioned at a point where tapering of the guide slit 611 of the error lever 610 initiates. Since the pawl lever 620 supports the first engagement step 530 of the claw 500, the striker 100 is in a state of being locked by the claw 500 while being inserted into the first insertion hole 210 of the base 200 and the second insertion hole 510 of the claw 500.

When a tailgate opening signal is input to the controller 900 at the request of the user in the above-described locked state, the controller 900 sends a drive signal to the drive motor 300. As the drive motor 300 is driven, the main gear 400 rotates in a counterclockwise direction (CCW), as indicated by an arrow in FIG. 5 and, as such, the first link 650 rotates. In accordance with the rotation of the first link 650, the second link 660 slides in a direction away from the main gear 400. In accordance with the sliding of the second link 660, the release lever 630 pivots about the second rotation shaft 640 in a counterclockwise direction (CCW) wherein the second coupler 670 moves away from the main gear 400. As a result, the pawl lever 620 pivotably coupled to the second rotation shaft 640 pivots away from the claw 500.

As the drive motor 300 is continuously driven, the main gear 400 further rotates in the counterclockwise direction (CCW) and, as such, the first link 650 causes the second link 660 to further press the release lever 630, as illustrated in FIG. 6. However, since the release lever 630 is pivotable only within a pivotal angle allowed by the first stopper 623, the guide protrusion 681 slides along the guide slit 611 toward the release lever 630 and, as such, engagement between the pawl lever 620 and the claw 500 is released. As a result, the claw 500 rotates in the counterclockwise direction (CCW), unlocking the striker 100. Accordingly, the tailgate is opened. After the tailgate is completely opened, the second detector 930 sends a signal to the controller 900. In response to the signal, the controller 900 continuously operates the drive motor 300 in the counterclockwise direction (CCW) until the set position of the main gear 400 is recognized and, as such, the main gear 400 is returned to the original position.

Figure 7:
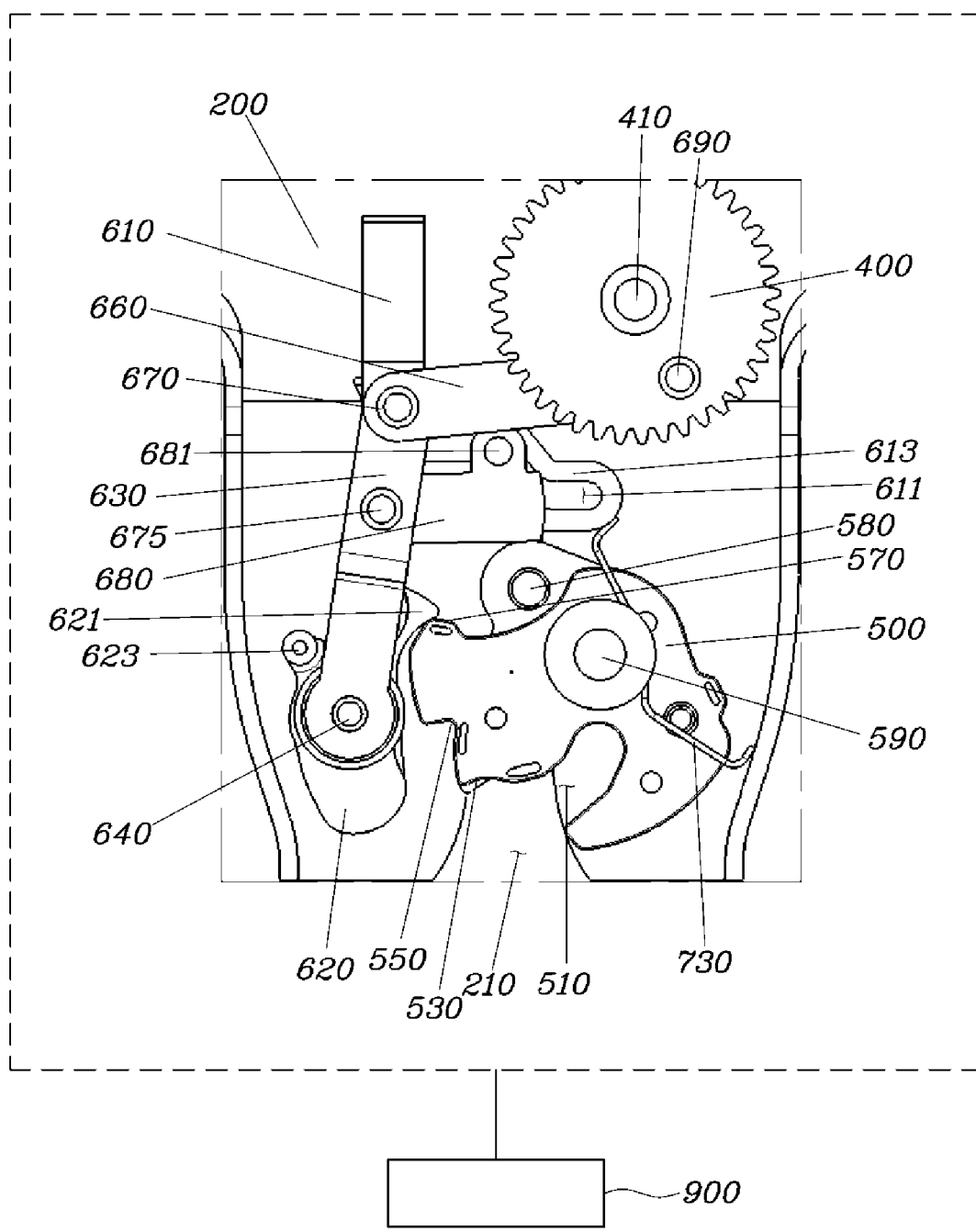
FIG. 7, FIG. 8, FIG. 9, and FIG. 10 are views illustrating a cinching operation conducted through rotation in one direction in a stepwise manner.

FIG. 7, FIG. 8, FIG. 9, and FIG. 10 are views illustrating a cinching operation in a stepwise manner. FIG. 7 illustrates an open state of the tailgate. When FIG. 7 is compared with FIG. 6, it can be seen that the main gear 400 has further rotated in the counterclockwise direction (CCW) wherein the first link 650 is positioned at the 5 o'clock direction (approximately 75°). The release lever 630 has pivoted toward the main gear 400 by the second link 660 and the first elastic member 710. In addition, the guide protrusion 681 of the cinching member 680 has been positioned at the position corresponding to the closed state of the tail gate as illustrated in FIG. 4. Of course, the claw 500 has rotated in the counterclockwise direction (CCW) wherein the first and second insertion holes 210 and 510 are opened.

Figure 8:
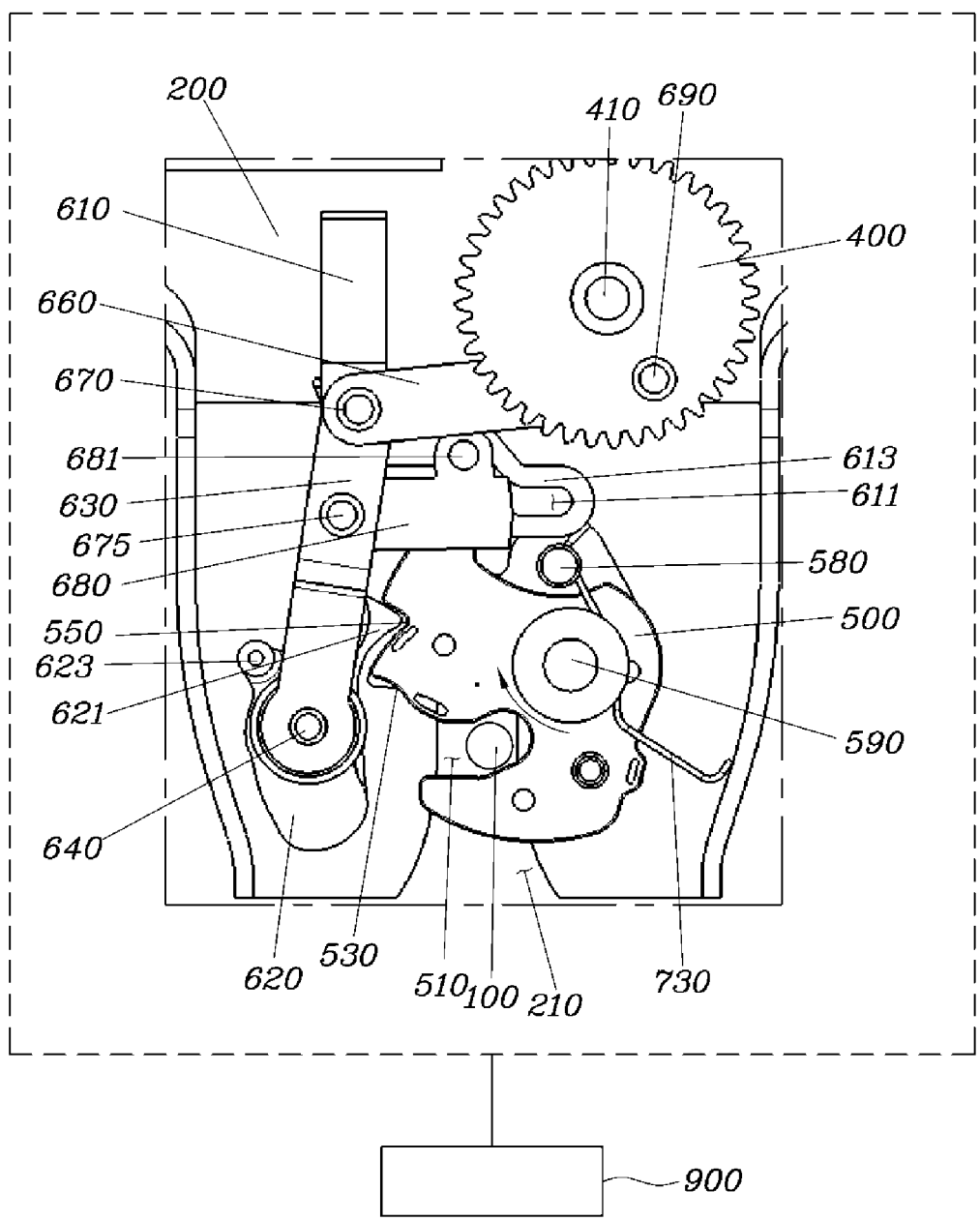

When the user closes the tailgate by pressing the tailgate, the striker 100 is inserted into the first insertion hole 210 of the base 200 and the second insertion hole 510 of the claw 500 while the tailgate pivots downwards. Subsequently, the striker 100 presses the claw 500. As a result, the claw 500 rotates in the clockwise direction (CW) by a pressing force applied thereto and, as such, a primary locking state of FIG. 8 is achieved. The present state is illustrated in FIG. 8.

Figure 9:
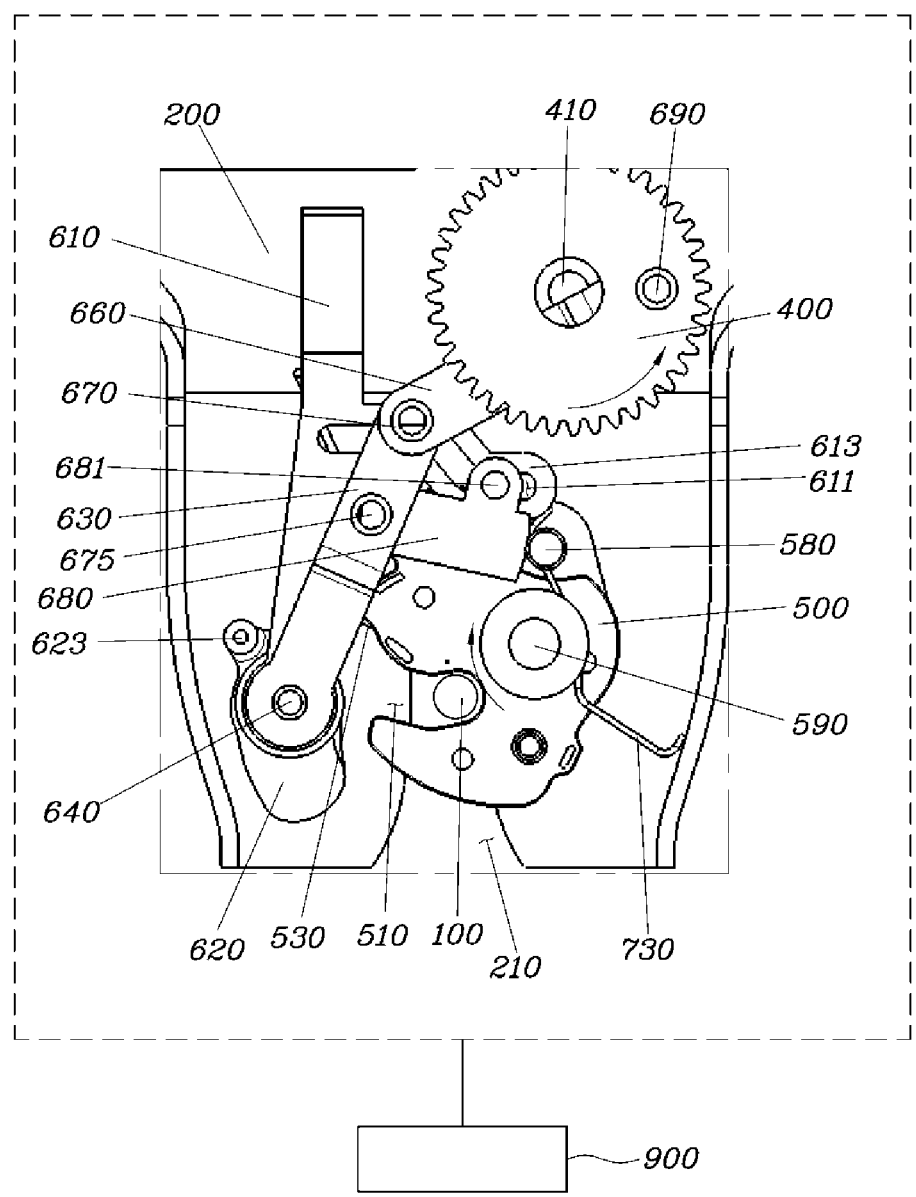
Figure 10:
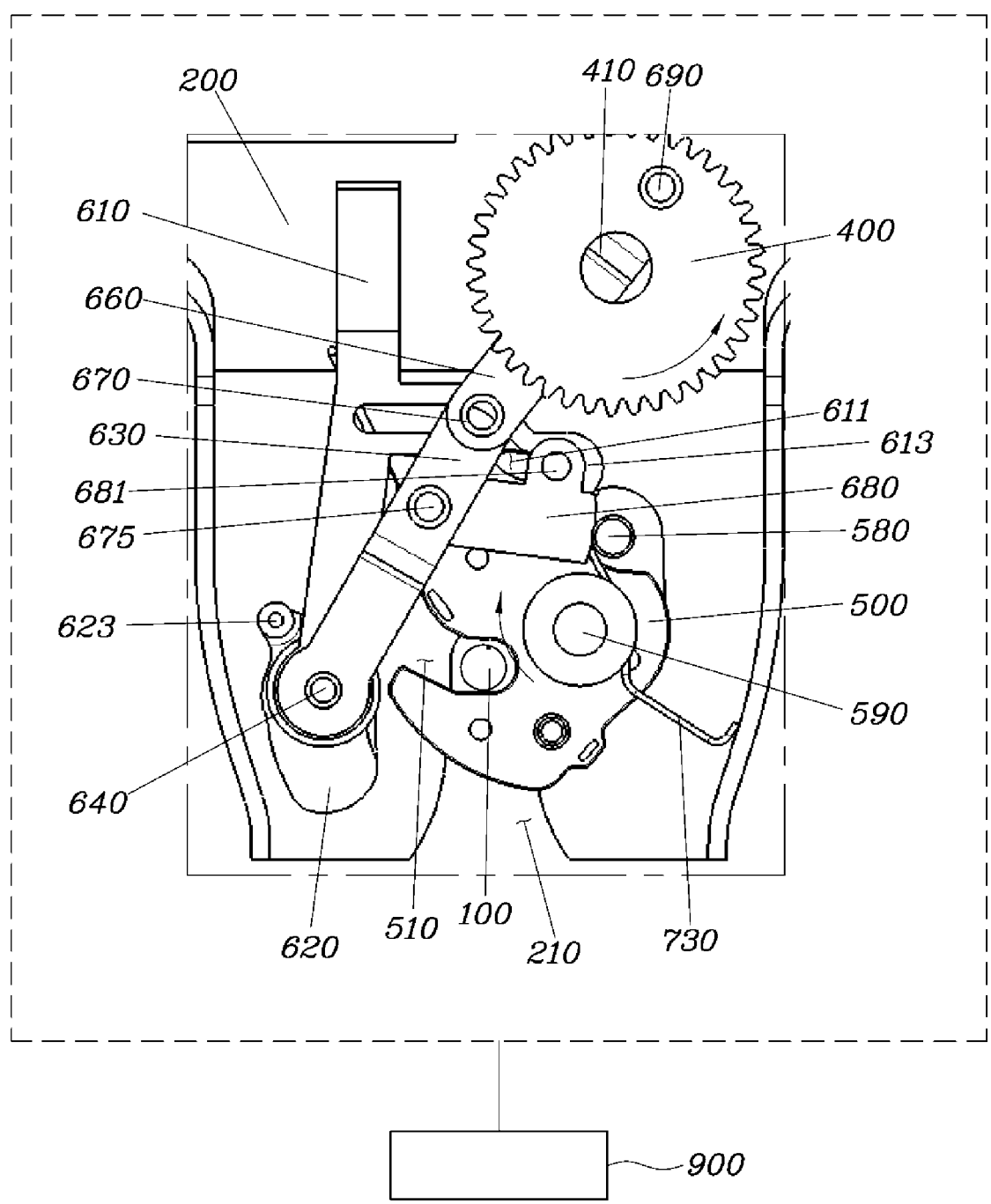

In the primary locking state of FIG. 8, the controller 900 receives a cinching signal from the third detector 950. In response to the cinching signal, the controller 900 operates the drive motor 300, to rotate the main gear 400 in the counterclockwise direction (CCW). In the present state, the cinching member 680 and the second stopper 580 are elastically in contact with each other by the first elastic member 710. As the drive motor 300 is driven in the counterclockwise direction (CCW), as illustrated in FIG. 9, the first and second links 650 and 660 pivot, causing the release lever 630 coupled to the second end portion of the second link 660 to pivot in a direction toward the claw 500, namely, in the clockwise direction (CW). In the present case, the release lever 630 continuously pivots, but movement of the cinching member 680 is limited by the second stopper 580. In the present state, the second link 660 and the release lever 630 continuously pivot in accordance with continuous rotation of the main gear 400.

When the release lever 630 cannot further pivot, the guide protrusion 681 of the cinching member 680 slides along the guide slit 611 to an end portion of the guide slit 611 toward the claw 500 and, as such, is supported by the end portion of the guide slit 611. In the present state, the cinching member 680 presses the second stopper 580, rotating the claw 500 in the clockwise direction (CW). As a result, the claw 500 achieves a secondary locking state. When the first detector 910 sends a signal to the controller 900 in the present state, the controller 900 stops operation of the drive motor 300. Thus, cinching is completed. After completion of cinching, the controller 900 receives a signal from the second detector 920, to recognize a position of the main gear 400. In accordance with the recognized position, the controller 900 drives the drive motor 300, to rotate the main gear 400 only in one direction, and, as such, the main gear 300 returns to the original position.

Figure 11:
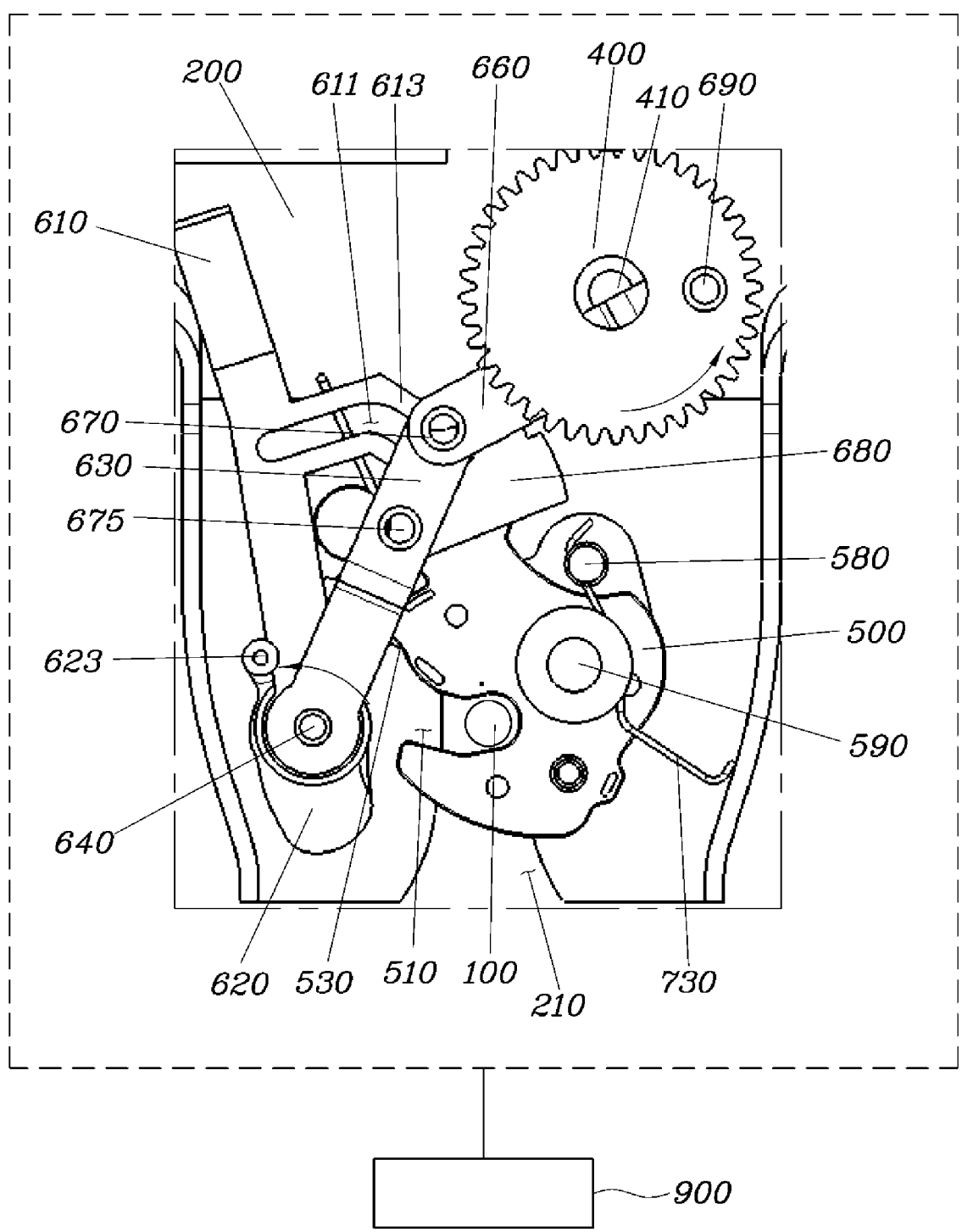
FIG. 11 is a view illustrating an interrupt operation in a stepwise manner.

FIG. 11 is a view illustrating an interrupt operation in a stepwise manner. When the user opens the tailgate using a vehicle key during cinching as illustrated in FIG. 7, FIG. 8, and FIG. 9 or when the tailgate is manually open in accordance with the operation of the emergency handle, the release lever 630 is pulled by a wire 850 to open the tailgate. The controller 900 determines the present state as an interrupt situation.

When the controller 900 determines that an interrupt situation has occurred, the guide protrusion 681 is positioned at the end portion of the guide slit 611 toward the claw 500 in accordance with a control operation of the controller 900. The main gear 400 rotates continuously in the counterclockwise direction (CCW), and the error lever 610 rotates about the second rotation shaft 640 in the counterclockwise direction (CCW), and, as such, the pawl lever 620 supporting the claw 500 is separated away from the claw 500. As a result, the striker 100 is separated from the first insertion hole 210 of the base 200 and the second insertion hole 510 of the claw 500. Thus, unlocking is achieved.

Figure 12:
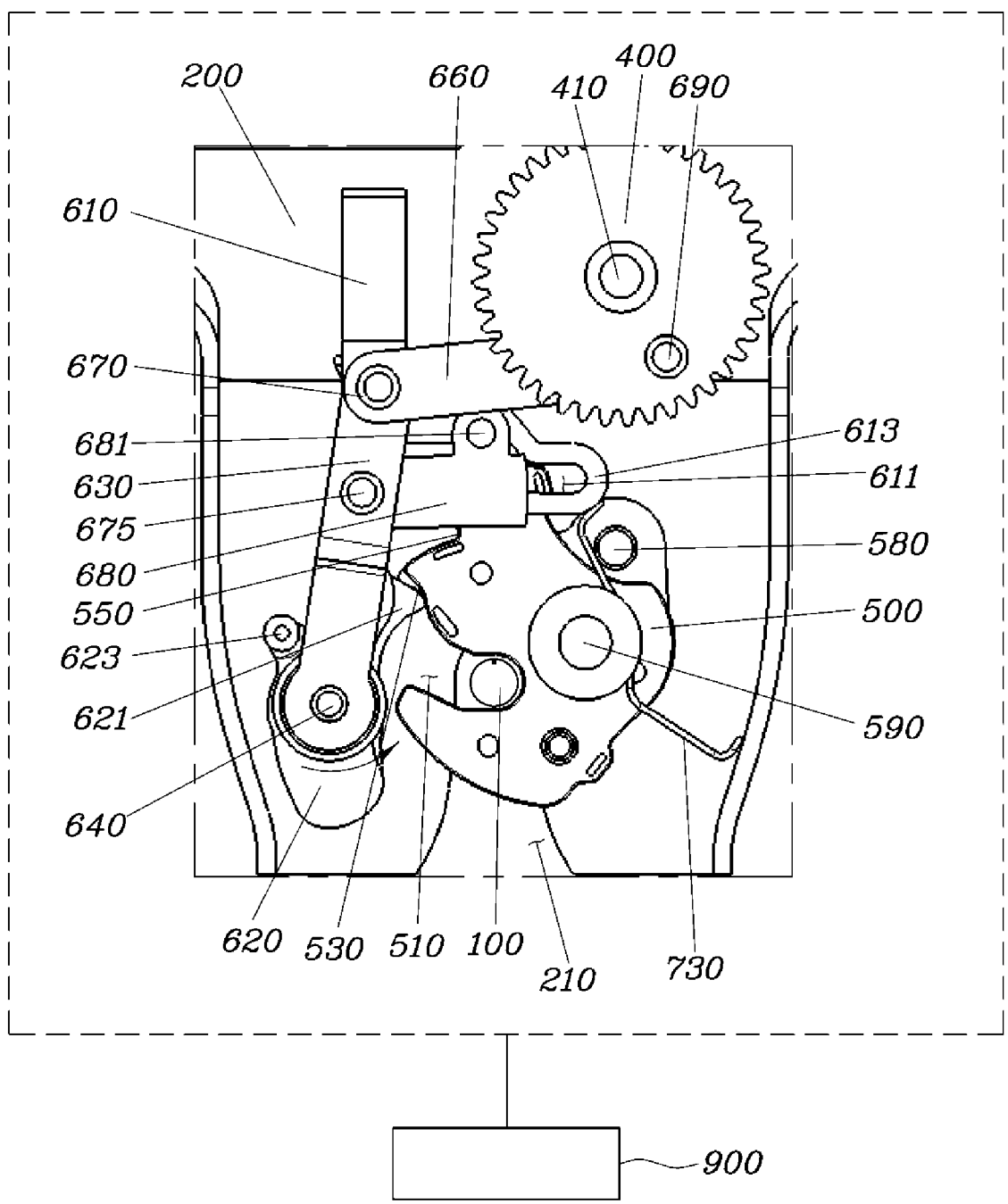
FIG. 12, FIG. 13, and FIG. 14 are views illustrating bidirectional rotation conducted during the release operation in a stepwise manner.
Figure 13:
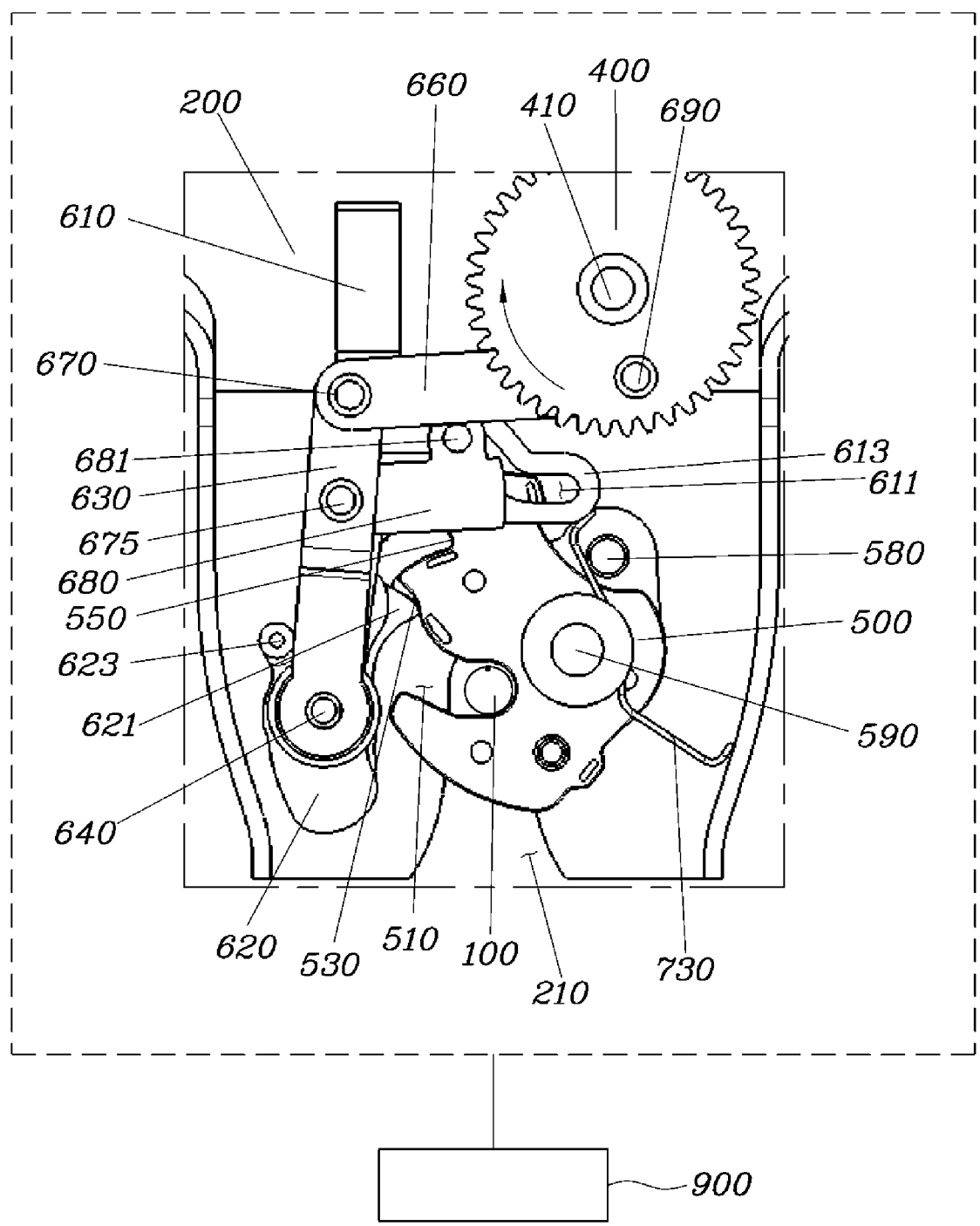
Figure 14:
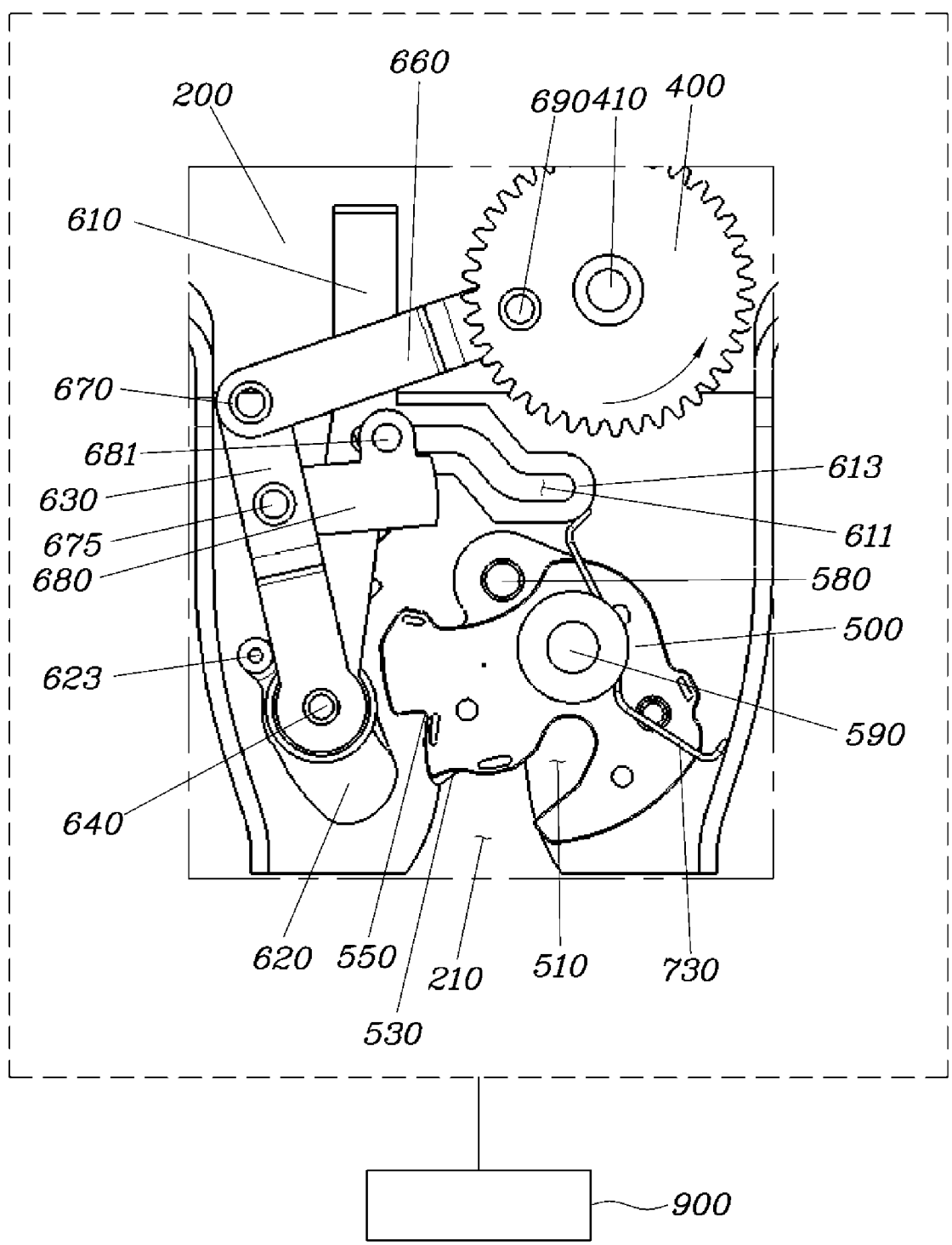

FIG. 12, FIG. 13, and FIG. 14 are views illustrating bidirectional rotation conducted during the release operation in a stepwise manner.

FIG. 12 is a view illustrating a closed state of the tailgate. The first link 650, which rotates together with the main gear 400, is positioned at the 5 o'clock direction (approximately 75°). In accordance with the position of the first link 650, the second link 660 and the release lever 630 are appropriately positioned. The guide protrusion 681 of the cinching member 680 is positioned at a point where tapering of the guide slit 611 of the error lever 610 initiates. Since the pawl lever 620 supports the first engagement step 530 of the claw 500, the striker 100 is in a state of being locked by the claw 500 while being inserted into the first insertion hole 210 of the base 200 and the second insertion hole 510 of the claw 500.

When a tailgate opening signal is input to the controller 900 at the request of the user in the above-described locked state, the controller 900 sends a drive signal to the drive motor 300. As the drive motor 300 is driven, the main gear 400 rotates in the clockwise direction (CW), as indicated by an arrow in FIG. 13 and, as such, the first link 650 rotates. In accordance with the rotation of the first link 650, the second link 660 slides in a direction away from the main gear 400. In accordance with the sliding of the second link 660, the release lever 630 pivots about the second rotation shaft 640 in the counterclockwise direction (CCW) wherein the second coupler 670 moves away from the main gear 400. As a result, the pawl lever 620 pivotably coupled to the second rotation shaft 640 pivots away from the claw 500.

As the drive motor 300 is continuously driven, the main gear 400 further rotates in the clockwise direction (CW) and, as such, the first link 650 causes the second link 660 to further press the release lever 630, as illustrated in FIG. 14. However, since the release lever 630 is pivotable only within the pivotal angle allowed by the first stopper 623, the guide protrusion 681 slides along the guide slit 611 toward the release lever 630 and, as such, engagement between the pawl lever 620 and the claw 500 is released. As a result, the claw 500 rotates in the counterclockwise direction (CCW), unlocking the striker 100. Accordingly, the tailgate is opened. After the tailgate is completely opened, the second detector 930 sends a signal to the controller 900. In response to the signal, the controller 900 operates the drive motor 300 in the counterclockwise direction (CCW) until the set position of the main gear 400 is recognized and, as such, the main gear 400 is returned to the original position.

Figure 15:
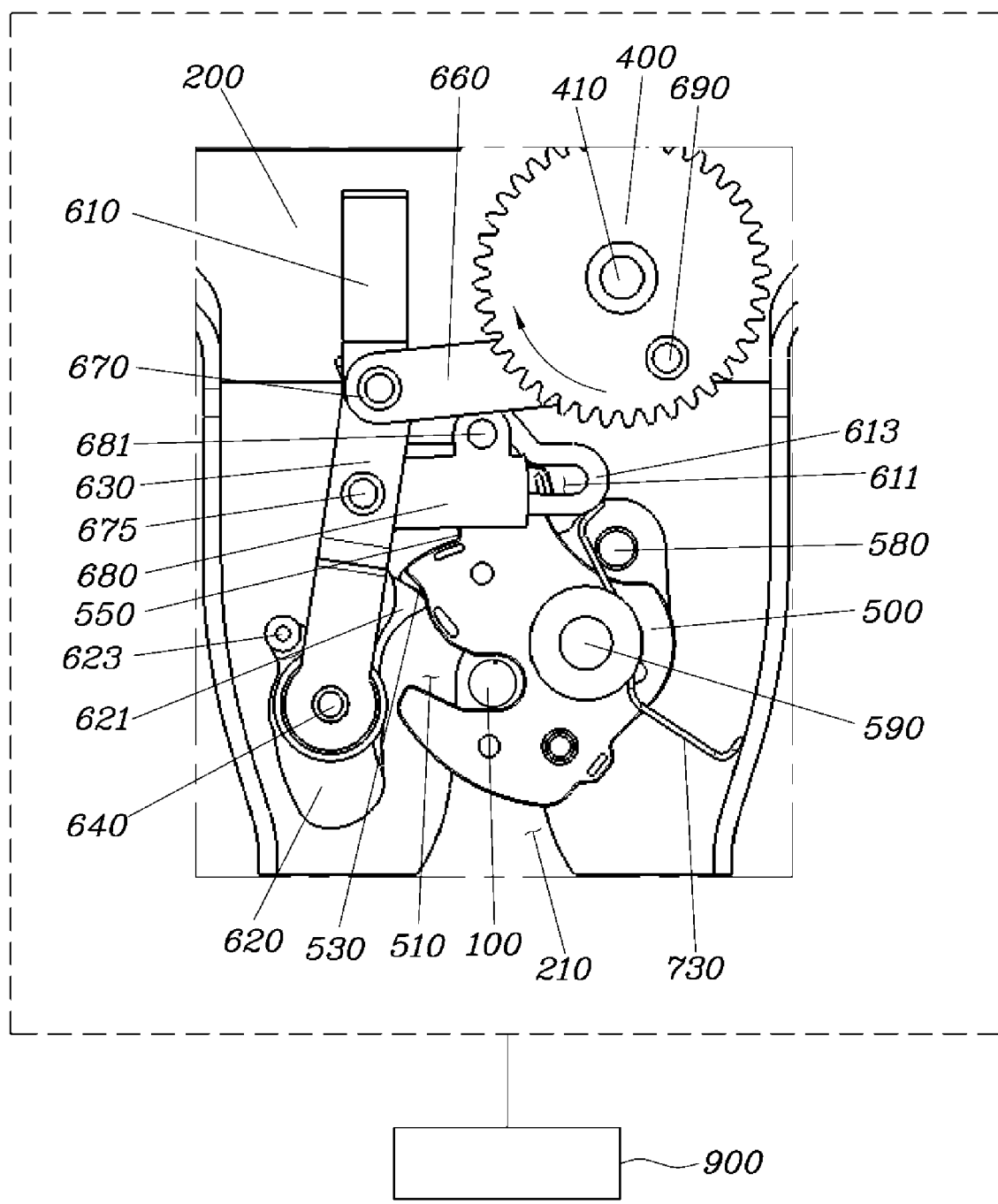
FIG. 15 is a view illustrating bidirectional rotation conducted during cinching in a stepwise manner.

FIG. 15 is a view illustrating bidirectional rotation conducted during cinching in a stepwise manner. Secondary locking is conducted through the same operations as those of FIG. 7, FIG. 8, FIG. 9, and FIG. 10. When cinching is subsequently completed, the controller 900 operates the drive motor 300 to rotate the main gear 400 in a direction reverse to the above-described direction, namely, the clockwise direction (CCW), until the set position of the main gear 400 is recognized and, as such, the main gear 400 is returned to the original position.

During the release operation, it may be possible to send the tailgate opening signal to the controller 900 by operating a button disposed in a passenger compartment by the user. When the button is operated, the wire 850 is pulled, achieving the primary locking state of the tailgate. Once the primary locking state of the tailgate is achieved, the main gear 400 rotates in accordance with the operation of the drive motor 300, to achieve complete opening of the tailgate. Otherwise, release may be conducted in accordance with the operation of the drive motor 300 alone.

Thus, the above-described tailgate opening and closing device has a cinching-integrated power latch structure, in detail, a cinching-integrated structure using a drive motor, a main gear, and a link assembly, and, as such, it may be possible to achieve a reduction in the number of constituent elements, a reduction in cost, and a reduction in weight through structural simplification. In addition, by the cinching-integrated structure, loss of operating power is reduced. Since the main gear is rotatable in the clockwise direction (CW) or in the counterclockwise direction (CCW), bidirectional release may be achieved. As a result, an enhancement in product quality may be achieved.

For convenience in explanation and accurate definition in the appended claims, the terms "upper", "lower" "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tailgate opening and closing device for a vehicle, the tailgate opening and closing device including:
   a base formed, at a first side thereof, with a first insertion hole into or from which a striker is configured to be inserted or withdrawn;
   a main gear disposed at a second side of the base so as to be rotatable about a first rotation shaft by a drive motor;
   a claw rotatably disposed at a side of the first insertion hole of the base, the claw including a second insertion hole configured for receiving the striker, to lock the striker when the striker is inserted into the first insertion hole and the second insertion hole; and
   a lever assembly including an error lever disposed adjacent to the main gear and the claw while extending across the base between the main gear and the claw, a pawl lever coupled to the base and configured for locking and unlocking the claw such that the claw locks and unlocks the striker, a release lever connected to the error lever and the pawl lever while being pivotable about a second rotation shaft coupled to the base, and a cinching member connected, at a first side thereof, to the release lever while being connected, at a second side thereof, to the error lever such that the cinching member is pivotable, causing the claw to lock the striker,
   wherein the pawl lever is pivotably coupled to the base by the second rotation shaft, together with the release lever and the error lever;
   wherein the pawl lever is formed, at a first side thereof, with an engagement protrusion extending toward the claw to prevent and allow rotation of the claw, thereby locking and unlocking the claw; and
   wherein the pawl lever is formed, at a second side thereof, with a first stopper to limit a pivotal angle of the release lever.

2. The tailgate opening and closing device according to claim 1, wherein the drive motor is mounted to the second side of the base at a position adjacent to the main gear, and a worm gear is disposed at the drive motor, to rotate the main gear about the first rotation shaft during an operation of the drive motor.

3. The tailgate opening and closing device according to claim 1, wherein the lever assembly further includes a first link mounted to the first rotation shaft, to which the main gear is mounted, wherein the first link rotates during a rotation of the main gear about the first rotation shaft, and a second link pivotably coupled, at a first end portion thereof, to the release lever while being pivotably coupled, at a second end portion thereof, to the first link, forming a first coupler and a second coupler to pivot the second link during the rotation of the first link.

4. The tailgate opening and closing device according to claim 3, wherein the release lever is pivotably coupled, at a first end portion thereof, to the second link while being pivotably coupled, at a second end portion thereof, to the base by the second rotation shaft, and the release lever is bent at a center portion thereof to have a stepped structure such that the second end portion of the release lever is closer to the base than the first end portion of the release lever.

5. The tailgate opening and closing device according to claim 4, wherein
   the error lever is disposed between the base and the release lever while being pivotably coupled, at a first end portion thereof, to the second rotation shaft;
   the error lever extends upwards from the first end portion thereof to a second end portion thereof along a vertical length of the base;
   the error lever is formed, at a center portion thereof, with an extension that extends across the base between the main gear and the claw; and
   the extension is formed with a guide slit at an inside thereof, and is disposed between the main gear and the claw.

6. The tailgate opening and closing device according to claim 5, wherein the guide slit of the extension has a shape extending across the base wherein the guide slit extends across the base by a predetermined length, then extends across the base by an additional predetermined length while tapering downwards through a predetermined angle, and finally extends across the base by a final predetermined length, to achieve locking of the striker by the claw.

7. The tailgate opening and closing device according to claim 5, wherein the cinching member is disposed at a first side of the release lever so as to be located between the release lever and the error lever, wherein the first side of the cinching member is pivotably coupled to the first end portion of the release lever, forming a third coupler, and a guide protrusion protrudes from the second end portion of the cinching member, wherein the guide protrusion protrudes into the guide slit, so as to be slidable along the guide slit during an operation of the lever assembly, for locking or unlocking of the claw.

8. The tailgate opening and closing device according to claim 7, wherein the guide protrusion further extends beyond the guide slit, and wherein the second link is engagable with the guide protrusion during an interrupt operation.

9. The tailgate opening and closing device according to claim 7, wherein a first elastic member is disposed at the third coupler where the release lever and the cinching member are coupled to one another, so as to continuously urge the release lever toward the claw.

10. The tailgate opening and closing device according to claim 1, wherein the claw has a first engagement step and a second engagement step, which are formed along an external peripheral surface of the claw, and wherein the pawl lever is engaged with the first and second engagement steps sequentially, achieving locking of the striker by the claw.

11. The tailgate opening and closing device according to claim 10,
    wherein the cinching member is slidable in addition to being pivotal, and
    wherein a second stopper is formed at the claw and configured to limit a sliding distance of the cinching member during sliding of the cinching member.

12. The tailgate opening and closing device according to claim 1, wherein a second elastic member is disposed at a third rotation shaft of the claw to constantly urge the claw toward the first insertion hole.

13. The tailgate opening and closing device according to claim 1, further including:
- a first detector disposed adjacent to the release lever;
- a second detector disposed adjacent to the main gear;
- a third detector disposed adjacent to the claw; and
- a controller configured for receiving positional signals from the first, second, and third detectors, and controlling the drive motor based on the received positional signals, the controller operating the drive motor upon determining insertion of the striker into the first and second insertion holes and the locking of the striker by the claw within the first and second insertion holes.

14. The tailgate opening and closing device according to claim 13, wherein the controller is configured to operate the drive motor to perform a cinching operation, upon receiving signals from the first and third detectors, and to perform a control operation to complete the cinching operation, upon subsequently receiving a signal from the first detector.

15. The tailgate opening and closing device according to claim 13, wherein, upon receiving a signal from the third detector when the unlocking of the striker by the claw, which includes a separation of the striker from the claw, has been completed, the controller is configured to perform a control operation to return a predetermined position of the main gear to an original position thereof through rotation from the drive motor.

16. The tailgate opening and closing device according to claim 13, wherein, upon receiving a tailgate opening signal, the controller is configured to operate the drive motor to rotate the main gear about the first rotation shaft so as to pivot the release lever, thereby causing rotation of the claw to unlock the striker.

* * * * *